Dec. 14, 1965 H. W. WEPRIN 3,223,530
PROCESS FOR PREPARING SAUSAGE
Filed Nov. 25, 1960 2 Sheets-Sheet 1
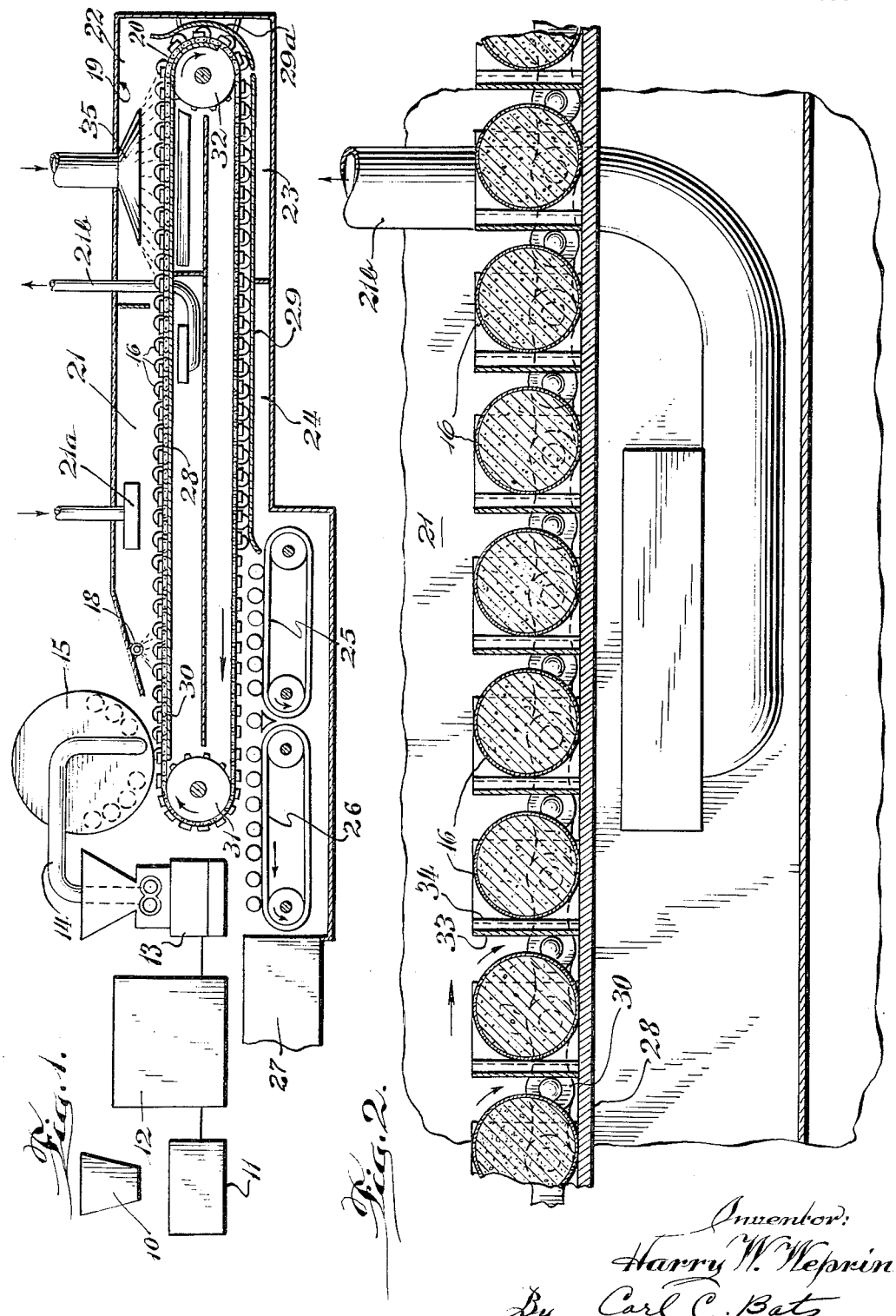
Inventor:
Harry W. Weprin
By Carl C. Batz
Attorney

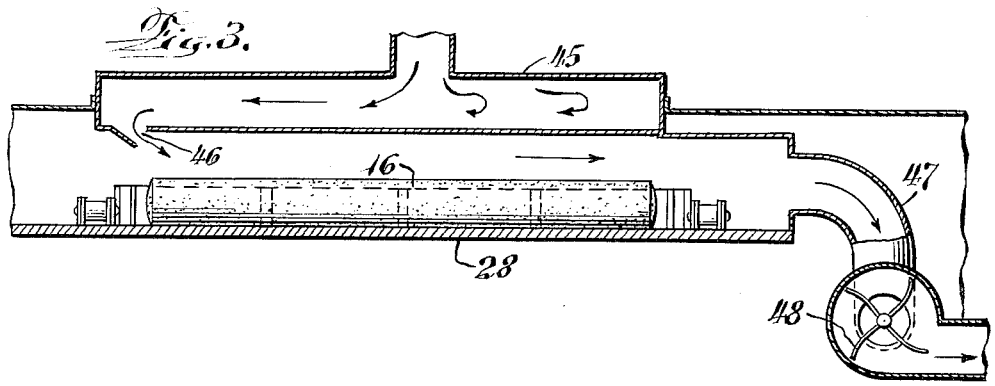

United States Patent Office 3,223,530
Patented Dec. 14, 1965

3,223,530
PROCESS FOR PREPARING SAUSAGE
Harry W. Weprin, Chicago, Ill., assignor to Armour and Company, Chicago, Ill., a corporation of Delaware
Filed Nov. 25, 1960, Ser. No. 71,543
2 Claims. (Cl. 99—109)

This invention relates to a continuous cooking and smoking process and apparatus. The invention is particularly useful in a process in which a unit mass of a comminuted meat mixture is subjected to rapid internal heating by means of passing an electric current therethrough and thereafter treating the formed mass.

An object of the present invention is to provide a method of manufacturing skinless sausages and the like using rapid internal heating, such as is accomplished by the passage of an electric current through the sausage mixture to coagulate protein and produce a formed sausage body, and thereafaer directing upon the formed body a high velocity hot air blast for forming a smooth, firm skin on the sausage having attractive surface characteristics and applying also smoke to the sausage to give it the desired smoked characteristics. A further object is to provide apparatus for accomplishing such treatment of the sausage after the forming operation to give it the desired surface characteristics. Yet another object is to provide a method and means for impinging a high velocity smoke-carrying blast of air upon rotating sausage units for the quick and effective formation thereon of a smooth uniform skin. Other specific objects and advantages will appear as the specification proceeds.

The invention is shown, in an illustrative embodiment, by the accompanying drawing, in which:

FIG. 1 is a diagrammatic showing, partly in section, of an apparatus which may be employed in the practice of my invention; FIG. 2 is a broken detail sectional view of conveyor apparatus for cylindrical sausages; and FIG. 3 is a vertical sectional view of means for applying a gaseous medium to the cylindrical sausages while being rolled by a conveyor.

In the schematic view shown in FIG. 1, 10 designates a container for receiving the comminuted meat or emulsion from a source such as an emulsifier. From container 10 the emulsion is passed to a vacuumizing unit 11, and from thence to a holding cooler 12.

From the holder 12, the emulsion is passed to a closed system stuffer 13 in which the emulsion is subjected to vacuum in a closed system and under sufficient pressure to close the voids within the emulsion, and the emulsion is then passed through the closed pipe 14 to the forming or cooking unit 15. The meat mixture or emulsion is stuffed into a mold within the unit 15, as described more clearly in the application of Gretler, Wilcox and Hopkins, Serial No. 64,404, filed October 24, 1960, now U.S. Patent No. 3,149,980, and as the unit rotates, the comminuted meat within the mold is subjected to an electric current passing therethrough to coagulate the proteins of the mixture, and the formed sausage, indicated by the numeral 16, is ejected upon a conveyor 20. For the purpose of illustration, the cylindrical sausages are shown on a greatly increased scale in proportion to the apparatus.

The formed or cooked sausage is subjected to a water wash or shower at 18 for removing coagulation products (protein, fat, and water). The washed sausages are passed into a post forming unit indicated generally by the numeral 19. A post forming conveyor 20 is mounted in the unit 19 and carries the sausages through a plurality of compartments or stations. The first station 21 may be employed for the application of hot air and smoke for the skin forming and smoking of the sausage. The next station 22 may be employed for the application of dye or hot wash water. The third station 23 is preferably employed for drying the sausage. The fourth station 24 is preferably used for chilling the sausages. From the chilling section 24, the sausages are delivered upon transfer conveyors 25 and 26 and are conveyed to a packing unit 27. The skin-forming gaseous medium may be introduced through the conduit 21a and withdrawn from chamber 21 by the conduit 21b. For example, heated air may be discharged into the chamber 21 and upon the sausages to form the skin on the sausages as they are rolled by the conveyor 20 and, if desired, smoke may be simultaneously introduced with the blast of hot air in the treating of the sausages in section 21. If desired, however, the smoke may be applied at a subsequent station as, for example, at station 24 after the sausages have been dyed and dried. I prefer, however, to impinge upon the formed sausages, as they are rotating, a hot air blast carrying entrained smoke.

In order to cause the impinging sheet or ribbon of smoke to cover the sausages uniformly, the sausages are rotated in their progress through the chamber 21. Any suitable conveyor apparatus may be employed for this purpose. In the specific illustration given, the conveyor 20 comprises an upper plate 28 and a lower plate 29 on which the sausages may roll. A removable curved plate 29a is provided for directing sausages downwardly upon plate 29. A chain conveyor 30 passes around sprockets 31 and 32, at least one of which is driven, and the chain conveyor carries transverse pusher bars 33 provided with forwardly-extending ribs 34 for engaging the cylindrical sausages at spaced distances to roll them over the plates 28 and 29.

In section 22, a spray or shower head 35 is provided for directing dye or wash water upon the cylindrical sausages. In section 23, hot air or other drying means may be employed for drying the sausages, while in section 24 chilled air is preferably introduced to effect a chilling of the sausages.

It is important that the skin-forming hot air, with or without smoke, be introduced at high velocity upon the skinless sausages 16, the air having a temperature of from 150 to 250° F. and the velocity within the chamber being very high and preferably about thirty feet per second (the volume flow being from 1200 to 2200 cubic feet per minute, and preferably from 1400 to 1800 cubic feet per minute). The preferred range is 170–180° F. The heated air travelling at such high velocity is effective in forming the skin upon the cylindrical sausages to provide a smooth, even covering for the sausages, and the skin-forming effect is enhanced when the gaseous medium is impinged as by sheets or ribbons upon the sausages as they rotate.

In the structure of FIG. 3, the hot air, or combined hot air and smoke, is introduced through a plenum chamber 45 having an elongated narrow outlet 46 for delivering a ribbon or sheet of smoke-laden air upon the cylindrical sausage 16 as the sausage is being rotated upon conveyor plate 28. The air and smoke are drawn away through outlet 47 by exhaust fan 48.

In each of the modifications shown, the hot air, and preferably hot air with entrained smoke, is delivered in ribbon form at high velocity upon the rotating sausages to bring about skin formation rapidly and uniformly, each sausage receiving a direct application of fresh smoke and the application being rendered more effective by the constant movement and rotation of the sausage itself.

As indicated best in FIG. 3, the hot air flow is along the axial direction of the sausages, and, at the velocity of approximately thirty feet per second, it is found that skin formation is quick and such formation is further accelerated by the rotating of the sausages as the air current sweeps lengthwise of the sausages. In each of the designs shown, the velocity of the air is high and there is a continuous turbulent flow along the sausages as they are rolled in their operation of being transported along the conveyor.

The foregoing detailed description has been given for purposes of explanation only and it is expected that changes may be made in the details of procedures without departing from the spirit of this invention.

I claim:

1. In a process for preparing sausage by encasing comminuted heat in a mold, passing an electric current therethrough to coagulate protein and to form a shaped-supporting sausage, and applying smoke to the sausage to give it the desired smoked characteristics, the improvement including the steps of chilling the sausage and impinging a high velocity air blast in the form of ribbons containing smoke directly on the rotating sausage axially thereof to form a skin thereon.

2. The process of claim 1 wherein the volumetric flow of air is from about 1200 to about 2200 cubic feet per minute.

References Cited by the Examiner

UNITED STATES PATENTS

| | | | |
|---|---|---|---|
| 1,715,625 | 6/1929 | Rind | 99—261 |
| 1,891,873 | 12/1932 | Elbe | 99—260 |
| 2,182,211 | 12/1939 | Paddock | 99—109 |
| 2,685,518 | 8/1954 | Prohaska | 99—109 |
| 2,995,449 | 8/1961 | Allen et al. | 99—109 |
| 3,068,104 | 12/1962 | Gretler et al. | 99—109 |
| 3,081,173 | 3/1963 | Gretler et al. | 99—109 |

A. LOUIS MONACELL, *Primary Examiner.*

ABRAHAM H. WINKELSTEIN, HYMAN LORD,
*Examiners.*